(12) United States Patent
Bhandari et al.

(10) Patent No.: US 8,013,251 B2
(45) Date of Patent: *Sep. 6, 2011

(54) ELECTRICAL WIRE COMPRISING AN AROMATIC POLYKETONE AND POLYSILOXANE/POLYIMIDE BLOCK COPOLYMER COMPOSITION

(75) Inventors: Yashpal Bhandari, Evansville, IN (US); Gurulingamurthy Haralur, Karnataka (IN); Kapil Sheth, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/650,950

(22) Filed: Dec. 31, 2009

(65) Prior Publication Data
US 2010/0147548 A1 Jun. 17, 2010

Related U.S. Application Data

(63) Continuation-in-part of application No. 12/049,669, filed on Mar. 17, 2008.

(51) Int. Cl.
*C08G 73/10* (2006.01)
*C08G 73/12* (2006.01)
*H01B 3/30* (2006.01)

(52) U.S. Cl. .................. 174/110 SR; 525/422; 525/431

(58) Field of Classification Search ............ 174/110 SR; 524/539; 525/431
See application file for complete search history.

(56) References Cited

U.S. PATENT DOCUMENTS

| | | | |
|---|---|---|---|
| 3,185,719 A | 5/1965 | Prober | |
| 3,847,867 A | 11/1974 | Heath et al. | |
| 3,850,885 A | 11/1974 | Takekoshi et al. | |
| 3,852,242 A | 12/1974 | White | |
| 3,855,179 A | 12/1974 | Wilkins et al. | |
| 3,972,902 A | 8/1976 | Heath et al. | |
| 3,983,093 A | 9/1976 | Williams, III et al. | |
| 3,986,477 A | 10/1976 | Bigland | |
| 4,038,237 A | 7/1977 | Snyder | |
| 4,414,355 A | 11/1983 | Pokorny | |
| 4,443,591 A | 4/1984 | Schmidt et al. | |
| 4,455,410 A | 6/1984 | Giles, Jr. | |
| 4,588,546 A | 5/1986 | Feil et al. | |
| 4,690,997 A | 9/1987 | Cella et al. | |
| 4,808,686 A | 2/1989 | Cella et al. | |
| 4,981,894 A | 1/1991 | Nye et al. | |
| 5,028,681 A | 7/1991 | Peters | |
| 5,032,279 A | 7/1991 | Lee | |
| 5,074,640 A | 12/1991 | Hardin et al. | |
| 5,095,060 A | 3/1992 | Haaf | |
| 5,202,946 A | 4/1993 | Hardin et al. | |
| 5,253,317 A | 10/1993 | Allen et al. | |
| 5,280,085 A | 1/1994 | Rock et al. | |
| 5,385,970 A | 1/1995 | Gallucci et al. | |
| 5,437,930 A | 8/1995 | Redondo et al. | |
| 5,552,222 A | 9/1996 | Bolon et al. | |
| 5,625,011 A | 4/1997 | Palsule | |
| 6,140,411 A | 10/2000 | Schwamborn et al. | |
| 6,985,690 B2 * | 1/2006 | Odell et al. .................. | 399/333 |
| 2007/0256969 A1 | 11/2007 | Ding et al. | |
| 2007/0298255 A1 | 12/2007 | Banerjee et al. | |
| 2007/0299213 A1 | 12/2007 | Banerjee et al. | |
| 2007/0299215 A1 | 12/2007 | Banerjee et al. | |
| 2008/0223602 A1 | 9/2008 | Gallucci et al. | |
| 2008/0236864 A1 | 10/2008 | Haralur | |
| 2009/0234060 A1 | 9/2009 | Haralur et al. | |

FOREIGN PATENT DOCUMENTS

| | | |
|---|---|---|
| EP | 0163464 A1 | 12/1985 |
| EP | 0254488 A2 | 1/1988 |
| EP | 266595 A2 * | 5/1988 |
| EP | 0273150 A2 | 7/1988 |
| EP | 323142 A2 * | 7/1989 |
| EP | 407061 A1 * | 1/1991 |
| EP | 0448359 A1 | 9/1991 |
| EP | 0568923 A1 | 11/1993 |
| EP | 9502642 | 1/1995 |
| EP | 0822559 A1 | 2/1998 |
| EP | 0955339 A1 | 11/1999 |
| WO | 8700846 | 2/1987 |
| WO | 0202158 | 1/2002 |
| WO | 03035719 | 5/2003 |
| WO | 2007149636 A1 | 12/2007 |

OTHER PUBLICATIONS

McGrath et al. "Synthesis and Characterization of Segmented Polyimide-Polyorganosiloxane Copolymers" Advances in Polymer Science, vol. 140, 1999, 61-105.*
http://www.ides.com/grades/ds/E110902.htm.*
http://www.ides.com/grades/ds/E110903.htm.*
Hedrick et al. "Poly(Arylene Ether Ketone)/Poly(Arylimide) Homo- and Polydimethylsiloxane Segmented Copolymer Blends: Influence of Chemical Structure on Miscibility and Physical Property Behavior", 35th International SAMPE Symposium, 1990, pp. 82-96.*
SABIC Innovative Plastics, Products and Markets Guide for Ultem and Siltem Resins, 2008, 36 pages.*
ULTEM Profile, 41 pages, GE Plastics 2001.
International Search Report for International Application No. PCT/US2009/037255, mailed May 18, 2009, 7 pages.
Written Opinion for International Search Report for International Application No. PCT/US2009/037255, mailed May 18, 2009, 6 pages.
Seguchi, T., et al. "Electrical and Mechanical Properties of Coaxial Cable for Use Under High Temperature and Radioactive Conditions", Electrical Engineering in Japan, vol. 118, No. 2, 1997, pp. 157-162.
Takemori, Michael T., "Towards an Understanding of the Heat Distortion Temperature of Thermoplastics," Polymer Engineering and Science, Nov. 1979, vol. 19, No. 15, pp. 1104-1109.

* cited by examiner

*Primary Examiner* — Robert Loewe
(74) *Attorney, Agent, or Firm* — Cantor Colburn LLP; Diderico van Eyl

(57) ABSTRACT

An electrical wire comprising a conductor and a covering disposed over the conductor. The covering comprises a thermoplastic composition. The thermoplastic composition comprises a blend of an aromatic polyketone and a polysiloxane/polyimide block copolymer. The composition can further comprise one or more additives.

11 Claims, 2 Drawing Sheets

ELECTRICAL WIRE COMPRISING AN AROMATIC POLYKETONE AND POLYSILOXANE/POLYIMIDE BLOCK COPOLYMER COMPOSITION

CROSS REFERENCE TO RELATED APPLICATIONS

This application is a continuation-in-part of U.S. patent application Ser. No. 12/049,669 filed on Mar. 17, 2008, which is incorporated in its entirety by reference herein.

BACKGROUND

Aromatic polyketones such as polyaryletherketone resins are crystalline resins valued due to their resistance to high temperatures, crystallizability, melt extrudability, and injection moldability, thereby making them versatile and useful in many situations. Crystallization of polymers is an important feature in polymer processing, because the structure developed during crystallization affects the mechanical and physical properties of the polymer product. The crystallization of polymers under processing conditions is essential for optimizing the processing conditions to obtain a product with desired properties.

Unfortunately, aromatic polyketones, such as polyaryletherketone resins frequently suffer from brittleness, e.g., poor toughness (low ductility), making them unsuitable for a range of applications.

There has been a long felt need to develop a composition that has a ductility that is better than aromatic ketones that still retains the advantageous processing features found in polyaryletherketone resins. Blends of polyaryletherketone resins with other resins have sought to solve this problem, but these blends have suffered from drawbacks such as insufficient ductility, delamination and the like. EP323142B1, for instance, discloses ternary blends of poly(arylene ether ketone) (PEEK), silicone-polyimide and polyetherimide. EP323142B1 teaches, in part, that although it would be expected that a blend of PEEK and silicone-polyimide would improve over PEEK alone, "this is not so." EP 323142B1 teaches that "it would seem that the two materials are insufficiently mutually compatible so that two phases remain after thorough blending resulting in separation and inhomogeneity upon extrusion and fibrillation and poor flexibility of the extruded product."

For the foregoing reasons, there remains a need for a non-delaminated blend composition that exhibits the high temperature performance features of polyaryletherketone resin and also exhibits excellent ductility properties.

BRIEF DESCRIPTION

The aforementioned need is addressed by a thermoplastic composition comprising a blend of a polysiloxane/polyimide block copolymer and an aromatic polyketone. The polysiloxane/polyimide block copolymer has a siloxane content of greater than 0 and less than 40 weight percent (wt %) based on the total weight of the block copolymer. The block copolymer comprises a siloxane block of Formula (I)

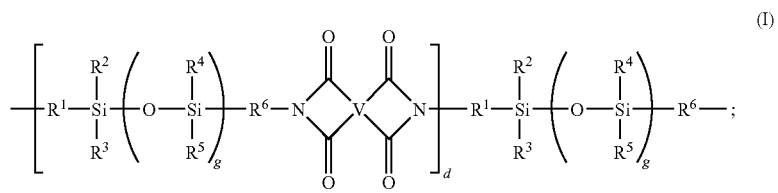

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. The composition may further comprise one or more additives.

Also described herein are articles formed by co-extrusion, extrusion and thermoforming that comprise the above-described composition.

One of these articles is an electrical wire comprising a conductor; and a covering disposed over the conductor wherein the covering comprises a thermoplastic composition. The thermoplastic composition comprises a blend of a polysiloxane/polyimide block copolymer and an aromatic polyketone. The polysiloxane/polyimide block copolymer has a siloxane content of greater than 0 and less than 40 weight percent (wt %) based on the total weight of the block copolymer. The block copolymer comprises a siloxane unit of Formula (I)

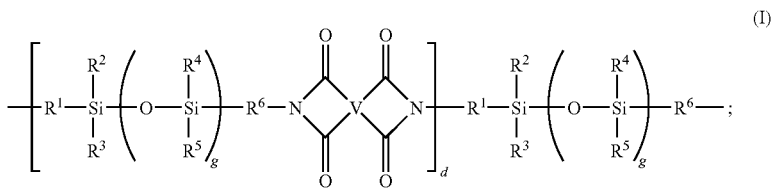

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20.

DETAILED DESCRIPTION

Figure 1:
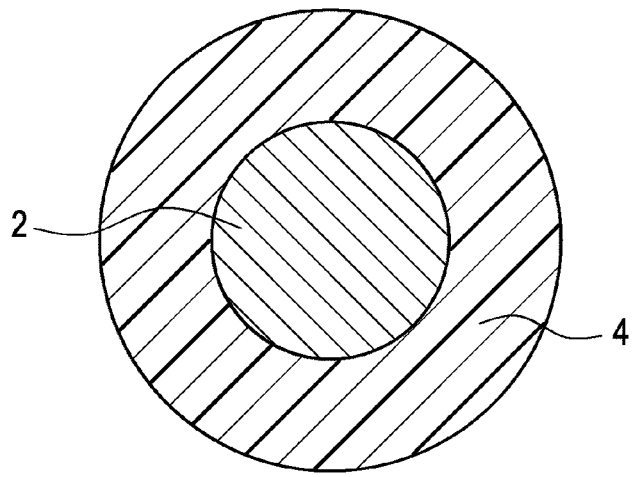
FIG. 1 is a schematic representation of a cross-section of conductive wire.

Disclosed herein is the unexpected discovery that it is now possible to improve the notched Izod properties of an aromatic polyketone by combining the aromatic polyketone with a specific amorphous polyimide-polysiloxane block copolymer under certain conditions. The resulting compositions exhibit a highly versatile combination of crystallizability features, high temperature resistance, and ductility properties that makes them useful in many applications.

It is unexpected that the addition of a polyketone to a polyimide-polysiloxane block copolymer would produce a blend having improved notched Izod over neat amorphous polyimide-polysiloxane block copolymer, in part, because the polyketone, by itself, ordinarily exhibits relatively poor notched Izod properties.

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" is intended to include both branched and straight-chain, saturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl.

The term "alkenyl" is defined as a branched or straight-chain unsaturated aliphatic hydrocarbon groups having one or more double bonds between two or more carbon atoms. Examples of alkenyl groups include ethenyl, propenyl, butenyl, pentenyl, hexenyl, heptenyl, octenyl and nonenyl and the corresponding $C_{2-10}$ dienes, trienes and quadenes.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of: —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl groups that may be the same or different.

The terms "halo" or "halogen" as used herein refer to fluoro, chloro, bromo and iodo.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "independently selected from", "independently at each occurrence" or similar language, means that the labeled R substitution groups may appear more than once and may be the same or different when appearing multiple times in the same structure. Thus the $R^1$ may be the same or different than the $R^6$ and if the labeled $R^6$ substitution group appears four times in a given permutation of Formula I, then each of those labeled $R^6$ substitution groups may be, for example, a different alkyl group falling within the definition of $R^6$.

Other than in examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values.

All ASTM tests were performed as required by the 2003 edition of the Annual Book of ASTM Standards unless otherwise indicated. All notched and unnotched Izod data and values were/are determined according to ASTM D256 at 23° C. as described in the Examples section unless another temperature has been specified. All tensile modulus, tensile strength, and elongation to break data and values were/are determined according to ASTM D638 as described in the Examples section. All flexural modulus and flexural strength data and values were/are determined according to ASTM D790 as described in the Examples section. All glass transition and melting temperatures are/were determined by differential scanning calorimetry (DSC) in a nitrogen atmosphere.

The term "non-delaminated" refers to the property of a composition or an article derived from the composition, in which the article or the composition does not exhibit visually observed separation of a surface layer showing a flaking or onion skin effect. A non-delaminated article may also be referred to herein as "essentially free from delamination."

Figure 4:
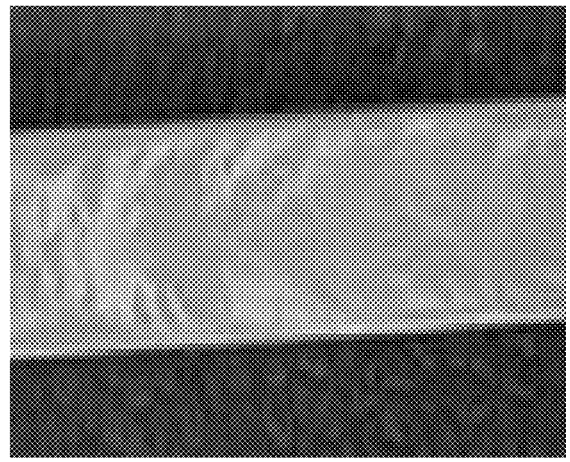
FIG. 4 is a picture of an injection molded bar showing delamination.
Figure 5:
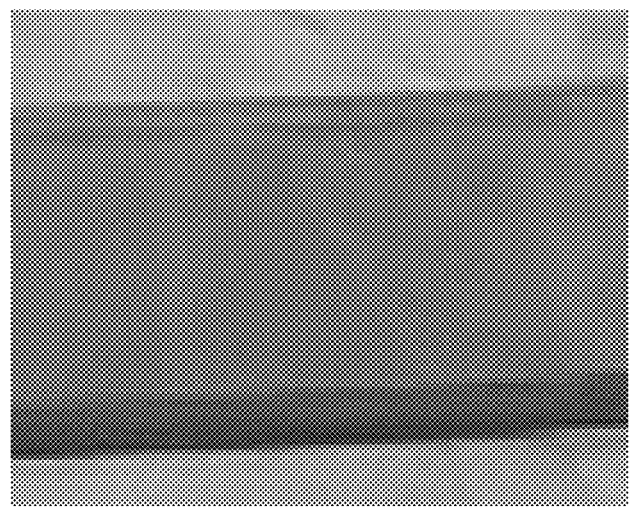
FIG. 5 is a picture of a non-delaminated injection molded bar.

"Essentially free from delamination" is defined as showing no delamination by visual inspection. In one embodiment, the specimen used for inspection is a molded bar. A specimen showing delamination is shown in FIG. 4. A specimen essentially free from delamination is shown in FIG. 5. "Visual inspection" is determined by unaided vision (e.g., 20/20 vision in the absence of any magnifying device with the exception of corrective lenses necessary for normal eyesight) at a distance of one half (½) meter.

The thermoplastic composition has a combination of high heat resistance and ductility as indicated by the glass transition temperature and notched Izod impact strength. The composition can have a glass transition temperature (Tg) of 100° C. to 300° C., or, more specifically, 120° to 250° C. Additionally, the composition can also have a melting temperature (Tm) of 250 to 450° C., or, more specifically, 300° C. to 400° C.

The composition shows a marked improvement in notched Izod impact strength when compared to the notched Izod impact strength of the component resins. The composition can have a notched Izod impact strength that is more than 10% greater than the expected notched Izod impact strength, or, more specifically, more than 50% greater than the expected notched Izod impact strength, or, more specifically, more than 100% greater than the expected notched Izod impact strength, or, even more specifically, more than 150% greater than the expected notched Izod impact strength. The notched Izod impact strength can be less than 1000% greater than the expected notched Izod impact strength. The calculation of the expected notched Izod impact strength is shown in the Examples. In some embodiments the composition has a notched Izod impact strength that is greater than the notched Izod impact strength of the aromatic polyketone used to make the composition, greater than the notched Izod impact strength of the polysiloxane/polyimide block copolymer used to make the composition, or greater than the notched Izod impact strength of the aromatic polyketone and the notched Izod impact strength of the polysiloxane/polyimide block copolymer used to make the composition.

In some embodiments the composition has a notched Izod impact strength that is greater than or equal to 70 Joules per meter, or, more specifically greater than or equal to 120 Joules per meter, or, more specifically, greater than or equal to 200 Joules per meter, or, more specifically greater than or equal to 300 Joules per meter, or, more specifically greater than or equal to 400 Joules per meter, or, more specifically greater than or equal to 500 Joules per meter, or, more specifically greater than or equal to 600 Joules per meter, or, more specifically greater than or equal to 800 Joules per meter, or, even more specifically, greater than or equal to 1000 Joules per meter. The notched Izod impact strength can be less than or equal to 5000 Joules per meter.

In some instances the formation of crystallinity is reflected in the crystallization temperature (Tc), which can be measured by a methods such as differential scanning calorimetry (DSC), for example, ASTM method D3418. The temperature of the maximum rate of crystallization may be measured as the Tc. In some embodiments, the composition has a Tc greater than or equal to about 200° C. when determined using a cooling rate of 90° C./min. In other embodiments, the composition has a crystallization temperature of greater than or equal to about 280° C. when determined at a cooling rate of 20° C./min.

The wire coating may have a tensile elongation at break of 10 to 300% when determined as described in the Examples. Within this range the tensile elongation at break can be greater than or equal to 250%, or, more specifically, greater than or equal to 200%. Also within this range the tensile elongation at break can be less than or equal to 100%, or, more specifically, less than or equal to 50%.

The composition may have a limiting oxygen index, as determined on 3.2 mm thickness Izod bars according to ISO 4589, of 30 to 60% oxygen. Within this range the limiting oxygen index may be greater than or equal to 35, or, more specifically greater than or equal 40% oxygen. Also within this range the limiting oxygen index may be less than or equal to 50, or, more specifically, less than or equal to 45% oxygen.

The aromatic polyketone comprises repeating units of Formula (II)

(II)

wherein Ar is independently at each occurrence a substituted or unsubstituted, monocyclic or polycyclic aromatic group having 6 to 30 carbons. Exemplary Ar groups include phenyl, tolyl, napthyl, and biphenyl. Additional aromatic groups are disclosed in WO 02/02158.

The aromatic polyketone can be a polyaryletherketone in which case it comprises repeating units of Formula (II) and repeating units of Formula (III)

(III)

wherein Ar is defined as above. In some embodiments the aromatic polyketone comprises a polyetherketone. Polyetherketone comprises repeating units of Formula (IV)

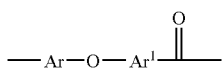

wherein Ar is defined as above and Ar¹. Ar¹ is independently at each occurrence a substituted or unsubstituted, monocyclic or polycyclic aromatic group having 6 to 30 carbons. Ar may be the same as or different from Ar¹. In some embodiments Ar and Ar¹ are phenyl groups.

In some embodiments the aromatic polyketone comprises a polyetheretherketone. Polyetheretherketone comprise repeating units of Formula (V)

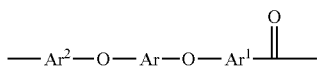

wherein Ar and Ar¹ are defined as above. Ar² is independently at each occurrence a substituted or unsubstituted, monocyclic or polycyclic aromatic group having 6 to 30 carbons. Ar, Ar¹, and Ar² may be the same as or different from each other. Additionally, two of Ar, Ar¹, and Ar² may be the same as each other and the third may be different. In some embodiments Ar, Ar¹, and Ar² are phenyl groups.

Aromatic polyketones are well known and commercially available. Examples of commercially available aromatic polyketones include PEEK™ polymers by VICTREX.

The aromatic polyketone can be present in an amount of 1 to 85 weight percent (wt %) based on the combined weight of the aromatic polyketone and the block copolymer. Within this range the aromatic polyketone may be present in an amount greater than or equal to 5 wt %, or, more specifically, greater than or equal to 10 wt %, or more specifically, greater than or equal to 25 wt %. Also within this range the polyaryletherketone may be present in an amount less than or equal to 90 wt %, or, more specifically, less than or equal to 75 wt %, or, more specifically, less than or equal to 50 wt %.

The polysiloxane/polyimide block copolymer has a siloxane content greater than 0 and less than 40 wt %, based on the total weight of the block copolymer. The polysiloxane/polyimide block copolymer can have a siloxane content greater than wt %, based on the total weight of the block copolymer. The polysiloxane/polyimide block copolymer comprises a siloxane block of Formula (I)

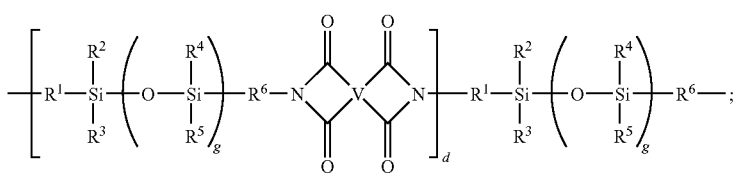

wherein $R^{1-6}$ independently at each occurrence selected from the group consisting of substituted or unsubstituted, saturated, unsaturated or aromatic monocyclic groups having 5 to 30 carbon atoms, substituted or unsubstituted, saturated, unsaturated or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20.

Polysiloxane/polyimide block copolymers comprise polysiloxane blocks and polyimide blocks. In random polysiloxane/polyimide block copolymers the size of the siloxane block is determined by the number of siloxy units (analogous to g in Formula (I)) in the monomer used to form the block copolymer. In some non-random polysiloxane/polyimide block copolymers the order of the polyimide blocks and polysiloxane blocks is determined but the size of the siloxane block is still determined by the number of siloxy units in the monomer. In contrast, the polysiloxane/polyimide block copolymers described herein have extended siloxane blocks. Two or more siloxane monomers are linked together to form an extended siloxane oligomer which is then used to form the block copolymer.

Polysiloxane/polyimide block copolymers having extended siloxane blocks are made by forming an extended siloxane oligomer and then using the extended siloxane oligomer to make the block copolymer. The extended siloxane oligomer is made by reacting a diamino siloxane and a dianhydride wherein either the diamino siloxane or the dianhydride is present in 10 to 50% molar excess, or, more specifically, 10 to 25% molar excess. "Molar excess" as used in this context is defined as being in excess of the other reactant. For example, if the diamino siloxane is present in 10% molar excess then for 100 moles of dianhydride are present there are 110 moles of diamino siloxane.

Diamino siloxanes have Formula (VI)

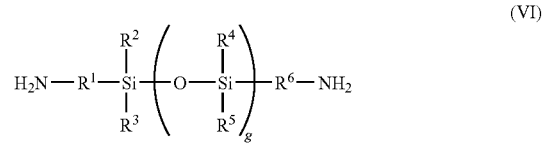

wherein $R^{1-6}$ and g are defined as above. In one embodiment $R^{2-5}$ are methyl groups and $R^1$ and $R^6$ are alkylene groups. The synthesis of diamino siloxanes is known in the art and is taught, for example, in U.S. Pat. Nos. 3,185,719 and 4,808,686. In one embodiment $R^1$ and $R^6$ are alkylene groups having 3 to 10 carbons. In some embodiments $R^1$ and $R^6$ are the same and in some embodiments $R^1$ and $R^6$ are different.

Dianhydrides useful for forming the extended siloxane oligomer have the Formula (VII)

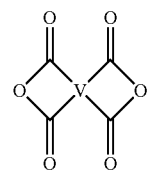

wherein V is a tetravalent linker as described above. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (VIII), such as:

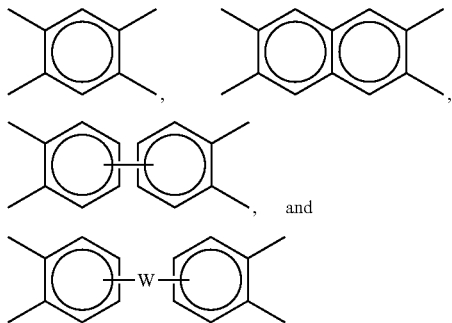
(VIII)

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes, but is not limited to, divalent moieties of Formula (IX)

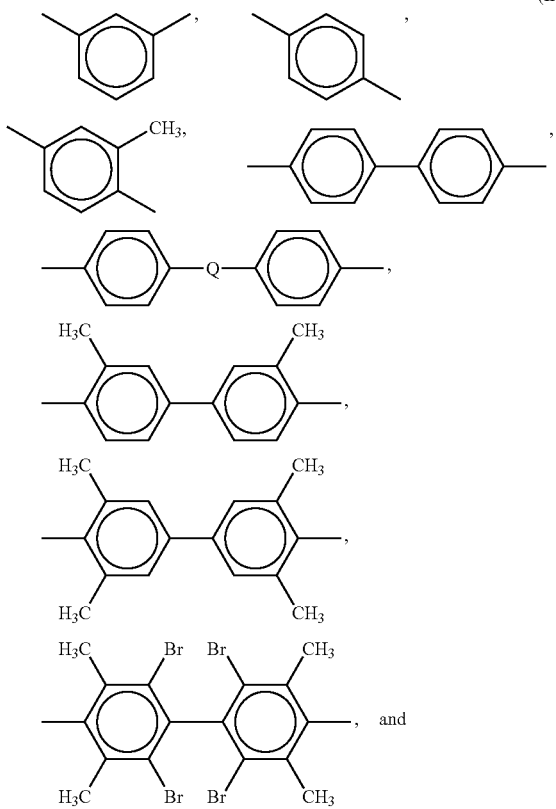
(IX)

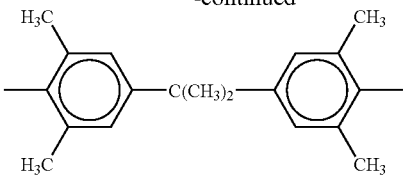

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

The diamino siloxane and dianhydride can be reacted in a suitable solvent, such as a halogenated aromatic solvent, for example orthodichlorobenzene, optionally in the presence of a polymerization catalyst such as an alkali metal aryl phosphinate or alkali metal aryl phosphonate, for example, sodium phenylphosphonate. In some instances the solvent will be an aprotic polar solvent with a molecular weight less than or equal to 500 to facilitate removal of the solvent from the polymer. The temperature of the reaction can be greater than or equal to 100° C. and the reaction may run under azeotropic conditions to remove the water formed by the reaction. In some embodiments the polysiloxane/polyimide block copolymer has a residual solvent content less than or equal to 500 parts by weight of solvent per million parts by weight of polymer (ppm), or, more specifically, less than or equal to 250 ppm, or, even more specifically, less than or equal to 100 ppm. Residual solvent content may be determined by a number of methods including, for example, gas chromatography.

The stoichiometric ratio of the diamino siloxane and dianhydride in the reaction to form the siloxane oligomer determines the degree of chain extension, (d in Formula (I)+1) in the extended siloxane oligomer. For example, a stoichiometric ratio of 4 diamino siloxane to 6 dianhydride will yield a siloxane oligomer with a value for d+1 of 4. As understood by one of ordinary skill in the art, d+1 is an average value for the siloxane containing portion of the block copolymer and the value for d+1 is generally rounded to the nearest whole number. For example a value for d+1 of 4 includes values of 3.5 to 4.5.

In some embodiments d is less than or equal to 50, or, more specifically, less than or equal to 25, or, even more specifically, less than or equal to 10.

The extended siloxane oligomers described above are further reacted with non-siloxane diamines and additional dianhydrides to make the polysiloxane/polyimide block copolymer. The overall molar ratio of the total amount of dianhydride and diamine (the total of both the siloxane and non-siloxane containing diamines) used to make the polysiloxane/polyimide block copolymer should be about equal so that the copolymer can polymerize to a high molecule weight. In some embodiments the ratio of total diamine to total dianhydride is 0.9 to 1.1, or, more specifically 0.95 to 1.05. In some embodiments the polysiloxane/polyimide block copolymer will have a number average molecular weight (Mn) of 5,000 to 50,000 Daltons, or, more specifically, 10,000 to 30,000 Daltons as determined using gel permeation chromatography and polystyrene standards. The additional dianhydride may be the same or different from the dianhydride used to form the extended siloxane oligomer.

The non-siloxane polyimide block comprises repeating units having the general Formula (X):

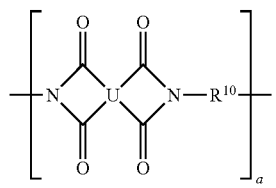

(X)

wherein a is more than 1, typically 10 to 1,000 or more, and can specifically be 10 to 500; and wherein U is a tetravalent linker without limitation, as long as the linker does not impede synthesis of the polyimide oligomer. Suitable linkers include, but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms; and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (VIII), such as:

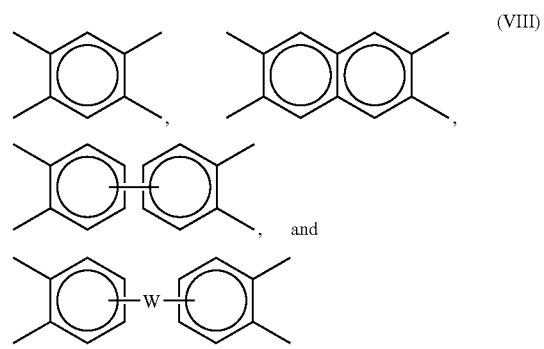

(VIII)

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3', 3,4',4,3', or the 4,4' positions, and wherein Z includes, but is not limited to, divalent moieties of Formula (IX).

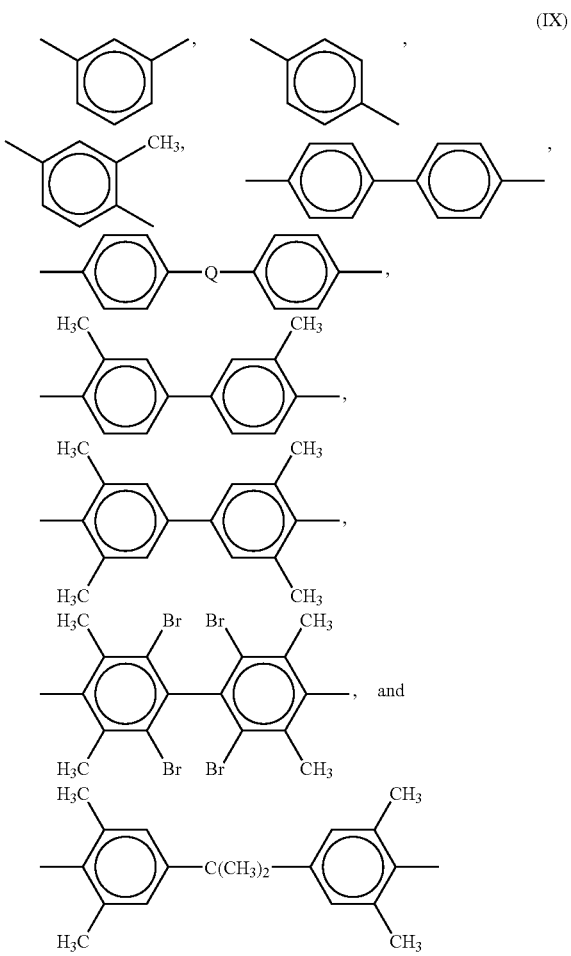

(IX)

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker U is free of halogens.

In some embodiments V in the polysiloxane block and U in the polyimide block are the same. In some embodiments V and U are different.

$R^{10}$ in Formula (X) includes, but is not limited to, substituted or unsubstituted divalent organic moieties such as: aromatic hydrocarbon moieties having 6 to 20 carbons and halogenated derivatives thereof; straight or branched chain alkylene moieties having 2 to 20 carbons; cycloalkylene moieties having 3 to 20 carbon atom; or divalent moieties of the general Formula (XI)

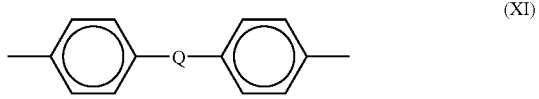
(XI)

wherein Q is defined as above. In some embodiments $R^9$ and $R^{10}$ are the same and in some embodiments $R^9$ and $R^{10}$ are different.

In some embodiments the polysiloxane/polyimide block copolymer is halogen free. Halogen free is defined as having a halogen content less than or equal to 1000 parts by weight of halogen per million parts by weight of block copolymer (ppm). The amount of halogen can be determined by ordinary chemical analysis such as atomic absorption. Halogen free polymers will further have combustion products with low smoke corrosivity, for example as determined by DIN 57472 part 813. In some embodiments smoke conductivity, as judged by the change in water conductivity can be less than or equal to 1000 micro Siemens. In some embodiments the smoke has an acidity, as determined by pH, greater than or equal to 5.

In one embodiment the non-siloxane polyimide blocks comprise a polyetherimide block. Polyetherimide blocks comprise repeating units of Formula (XII):

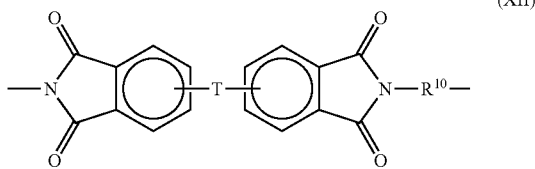
(XII)

wherein T is —O— or a group of the Formula —O—Z—O— wherein the divalent bonds of the —O— or the —O—Z—O— group are in the 3,3', 3,4', 4,3', or the 4,4' positions, and wherein Z and $R^{10}$ are defined as described above.

The polyetherimide block can comprise structural units according to Formula (XII) wherein each $R^{10}$ is independently derived from p-phenylene, m-phenylene, diamino aryl sulfone or a mixture thereof and T is a divalent moiety of the Formula (XIII):

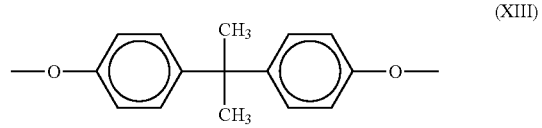
(XIII)

Included among the many methods of making the polyimide oligomer, particularly polyetherimide oligomers, are those disclosed in U.S. Pat. Nos. 3,847,867; 3,850,885; 3,852,242; 3,855,178; 3,983,093; and 4,443,591.

The repeating units of Formula (X) and Formula (XII) are formed by the reaction of a dianhydride and a diamine. Dianhydrides useful for forming the repeating units have the Formula (XIV)

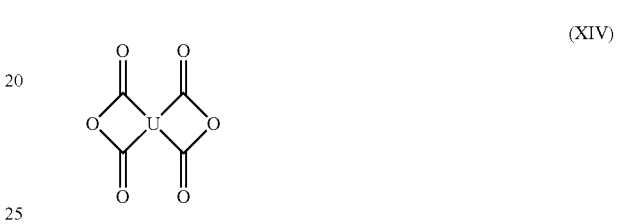
(XIV)

wherein U is as defined above. As mentioned above the term dianhydrides includes chemical equivalents of dianhydrides.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

Diamines useful for forming the repeating units of Formula (X) and (XII) have the Formula (XV)

(XV)

wherein $R^{10}$ is as defined above. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetetramine, hex amethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis (p-amino-t-butyl) toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) sulfone, bis(4-aminophenyl)ether and 1,3-bis(3-aminopropyl) tetramethyldisiloxane. Mixtures of these compounds may also be used. In one embodiment the diamine is an aromatic diamine, or, more specifically, m-phenylenediamine, p-phenylenediamine, sulfonyl dianiline and mixtures thereof.

In general, the reactions can be carried out employing various solvents, e.g., o-dichlorobenzene, m-cresol/toluene, and the like, to effect a reaction between the dianhydride of Formula (XIV) and the diamine of Formula (XV), at temperatures of 100° C. to 250° C. Alternatively, the polyimide block or polyetherimide block can be prepared by melt polymerization or interfacial polymerization, e.g., melt polymerization of an aromatic bis(ether anhydride) and a diamine by heating a mixture of the starting materials to elevated temperatures with concurrent stiffing. Generally, melt polymerizations employ temperatures of 200° C. to 400° C.

A chain-terminating agent may be employed to control the molecular weight of the polysiloxane/polyimide block copolymer. Mono-functional amines such as aniline, or mono-functional anhydrides such as phthalic anhydride may be employed.

The polysiloxane/polyimide block copolymer may be made by first forming the extended siloxane oligomer and then further reacting the extended siloxane oligomer with non-siloxane diamine and dianhydride. Alternatively a non-siloxane diamine and dianhydride may be reacted to form a polyimide oligomer. The polyimide oligomer and extended siloxane oligomer can be reacted to form the polysiloxane/polyimide block copolymer.

When using a polyimide oligomer and an extended siloxane oligomer to form the block copolymer, the stoichiometric ratio of terminal anhydride functionalities to terminal amine functionalities is 0.90 to 1.10, or, more specifically, 0.95 to 1.05. In one embodiment the extended siloxane oligomer is amine terminated and the non-siloxane polyimide oligomer is anhydride terminated. In another embodiment, the extended siloxane oligomer is anhydride terminated and the non-siloxane polyimide oligomer is amine terminated. In another embodiment, the extended siloxane oligomer and the non-siloxane polyimide oligomer are both amine terminated and they are both reacted with a sufficient amount of dianhydride (as described above) to provide a copolymer of the desired molecular weight. In another embodiment, the extended siloxane oligomer and the non-siloxane polyimide oligomer are both anhydride terminated and they are both reacted with a sufficient amount of diamine (as described above) to provide a copolymer of the desired molecular weight. Reactions conditions for the polymerization of the siloxane and polyimide oligomers are similar to those required for the formation of the oligomers themselves and can be determined without undue experimentation by one of ordinary skill in the art.

The siloxane content in the block copolymer is determined by the amount of extended siloxane oligomer used during polymerization. The siloxane content is greater than 0 and less than 40 weight percent, based on the total weight of the block copolymer. In some embodiments the siloxane content can be greater than or equal to 20 weight percent, or, more specifically, greater than or equal to 25 weight percent, based on the total weight of the block copolymer. The siloxane content is calculated using the molecular weight of the diamino siloxane used to form the extended siloxane oligomer.

In some embodiments two or more polysiloxane/polyimide block copolymers may be combined to achieve the desired siloxane content for use in the blend. The block copolymers may be used in any proportion. For example, when two block copolymers are used the weight ratio of the first block copolymer to the second block copolymer may be 1 to 99.

The polysiloxane/polyimide block copolymer is present in an amount of 5 to 99 weight percent (wt %) based on the combined weight of the aromatic polyketone and the polysiloxane/polyimide block copolymer. Within this range the polysiloxane/polyimide block copolymer may be present in an amount greater than or equal to 10 wt %, or, more specifically, greater than or equal to 25 wt %. Also within this range the polysiloxane/polyimide block copolymer may be present in an amount less than or equal to 95 wt %, or, more specifically, less than or equal to 90 wt %, or, more specifically, less than or equal to 75 wt %.

In some embodiments the blend of a polysiloxane/polyimide block copolymer and an aromatic polyketone has a siloxane content, based on the combined weight of the polysiloxane/polyimide block copolymer and the aromatic polyketone, of 1 to 25 wt %. Within this range the siloxane content can be greater than or equal to 5 wt %, or, more specifically, greater than or equal to 7 wt %. Also within this range the siloxan content can be less than or equal to 23 wt %.

The composition may further comprise an additive or combination of additives. Exemplary additives include reinforcing fillers, stabilizers, lubricants, mold release agents, inorganic pigments, UV absorbers; antioxidants, plasticizers; anti-static agents; foaming agents; blowing agents; metal deactivators and combinations comprising one or more of the foregoing. Examples of reinforcing fillers include glass beads (hollow and/or solid), glass flake, milled glass, glass fibers, talc, wollastonite, silica, mica, kaolin or montmorillonite clay, silica, quartz, barite, and the like, and combinations comprising any of the foregoing reinforcing fillers. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

The reinforcing filler may be present in an amount less than or equal to 60 weight percent, based on the total weight of the composition. Within this range the reinforcing filler may be present in an amount greater than or equal to 10 weight percent, or more specifically, greater than or equal to 20 weight percent. Also within this range the reinforcing filler may be present in an amount less than or equal to 50 weight percent, or, more specifically, less than or equal to 40 weight percent.

In some embodiments, the compositions may further include at least one additional polymer. Examples of such additional polymers include and are not limited to PPSU (polyphenylene sulfone), PEI (poly(ether imide)), PSU (polysulfone), PC (polycarbonate), PPE (polyphenylene ether), PMMA (poly methyl methacrylate), ABS, (acrylonitrile butadiene styrene), PS (polystyrene), PVC (polyvinylchloride), PFA (per fluoro aalkoxy alkane), MFA (co-polymer of TFE tetra fluoro ethylene and PFVE perfluorinated vinyl ether), FEP (fluorinated ethylene propylene polymers), PPS (poly(phenylene sulfide), ECTFE (ethylene chloro trifluoro ethylene), PVDF (polyvinylidene fluoride), PTFE (polytetrafluoroethylene), PET (polyethylene terephthalate), POM (polyacetal), PA (polyamide), UHMW-PE (ultra high molecular weight polyethylene), PP (polypropylene), PE (polyethylene), HDPE (high density polyethylene), LDPE (low density polyethylene), PBI (polybenzimidizole) and PAI (poly(amide-imide)), poly(ether sulfone), poly(aryl sulfone), polyphenylenes, polybenzoxazoles, polybenzothiazoles, as well as blends and co-polymers thereof.

The thermoplastic composition can be prepared by melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the block copolymers and less than the degradation temperatures of either of the block copolymers.

All of the ingredients may be added initially to the processing system. In some embodiments, the ingredients may be added sequentially and/or through the use of one or more master batches. It can be advantageous to apply a vacuum to the melt through one or more vent ports in the extruder to remove volatile impurities in the composition.

In some embodiments melt mixing is performed using an extruder and the composition exits the extruder in a strand or multiple strands. The shape of the strand is dependent upon the shape of the die used and has no particular limitation.

The thermoplastic composition may be used to make extruded tubes or conductive wire. A conductive wire comprises a conductor and a covering disposed over the conductor. The covering comprises the thermoplastic composition described above. The composition is applied to the conductor by a suitable method such as extrusion coating to form a conductive wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments it may be useful to dry the thermoplastic composition before extrusion coating. Exemplary drying conditions are 60 to 110° C. for 2 to 20 hours. Additionally, in one embodiment, during extrusion coating, the thermoplastic composition is melt filtered, prior to formation of the coating, through one or more filters. In some embodiments the thermoplastic composition will have substantially no particles greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a solvent, such as chloroform, and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a conductive wire that will not have electrically conductive defects as well as giving coatings with improved mechanical properties, for instance elongation.

The extruder temperature during extrusion coating is generally less than the degradation temperature of the polyaryletherketone and polysiloxane/polyimide block copolymer. Additionally the processing temperature is adjusted to provide a sufficiently fluid molten composition to afford a covering for the conductor, for example, higher than the softening point of the thermoplastic composition, or more specifically at least 20° C. higher than the melting point of the thermoplastic composition.

After extrusion coating the conductive wire is usually cooled using a water bath, water spray, air jets or a combination comprising one or more of the foregoing cooling methods. Exemplary water bath temperatures are 20 to 85° C.

The thermoplastic composition can be applied to the conductor to form a covering disposed over and in physical contact with the conductor. Additional layers may be applied to the covering. Methods of coating a conductor which may be used are well known in the art and are discussed for example in U.S. Pat. Nos. 4,588,546 to Feil et al.; 4,038,237 to Snyder et al.; 3,986,477 to Bigland et al.; and 4,414,355 to Pokorny et al. The thermoplastic composition can be applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. Alternatively, a metal deactivator can be mixed with the polysiloxane/polyimide block copolymers. In another example the intervening layer comprises a thermoplastic or thermoset composition that, in some cases, is foamed.

The conductor may comprise a single strand or a plurality of strands. In some cases, a plurality of strands may be bundled, twisted, braided, or a combination of the foregoing to form a conductor. Additionally, the conductor may have various shapes such as round or oblong. Suitable conductors include, but are not limited to, copper wire, aluminum wire, lead wire, and wires of alloys comprising one or more of the foregoing metals. The conductor may also be coated with, e.g., tin, gold or silver. In some embodiments the conductor comprises optical fibers.

The cross-sectional area of the conductor and thickness of the covering may vary and is typically determined by the end use of the conductive wire. The conductive wire can be used as conductive wire without limitation, including, for example, for harness wire for automobiles, wire for household electrical appliances, wire for electric power, wire for instruments, wire for information communication, wire for electric cars, as well as ships, airplanes, and the like.

In some embodiments the covering may have a thickness of 0.01 to 10 millimeters (mm) or, more specifically, 0.05 to 5 mm, or, even more specifically 1 to 3 mm.

Figure 2:
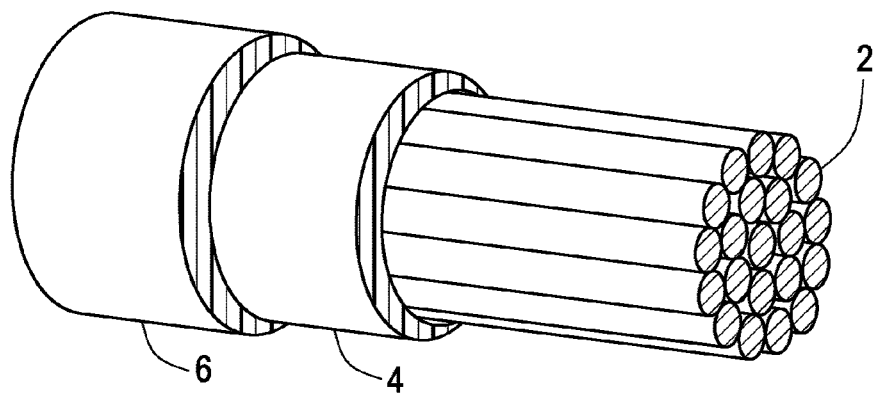
FIGS. 2 and 3 are perspective views of a conductive wire having multiple layers.
Figure 3:
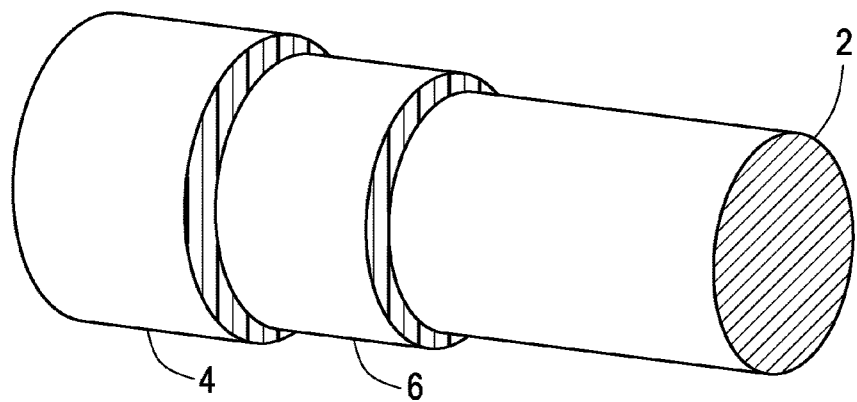

A cross-section of an exemplary conductive wire is seen in FIG. 1. FIG. 1 shows a covering, 4, disposed over a conductor, 2. In one embodiment, the covering, 4, comprises a foamed thermoplastic composition. Perspective views of exemplary conductive wires are shown in FIGS. 2 and 3. FIG. 2 shows a covering, 4, disposed over a conductor, 2, comprising a plurality of strands and an optional additional layer, 6, disposed over the covering, 4, and the conductor, 2. In one embodiment, the covering, 4, comprises a foamed thermoplastic composition. Conductor, 2, can also comprise a unitary conductor. FIG. 3 shows a covering, 4, disposed over a unitary conductor, 2, and an intervening layer, 6. In one embodiment, the intervening layer, 6, comprises a foamed composition. Conductor, 2, can also comprise a plurality of strands.

Multiple conductive wires may be combined to form a cable. The cable may comprise additional protective elements, structural elements, or a combination thereof. An exemplary protective element is a jacket, which surrounds the group of conductive wires. The jacket and the covering on the conductive wires, singly or in combination, may comprise the thermoplastic composition described herein. A structural element is a typically non-conductive portion which provides additional stiffness, strength, shape retention capability or the like.

A color concentrate or master batch may be added to the composition prior to or during extrusion coating. When a color concentrate is used it is typically present in an amount less than or equal to 3 weight percent, based on the total weight of the composition. In one embodiment the master batch comprises a polysiloxane/polyimide block copolymer.

The thermoplastic composition can be coextruded with an additional thermoplastic composition to form a multi-layer article. The additional thermoplastic composition can comprise polyaryletherketone, poly(arylene ether), polysulfone, polyolefin, polyamide, or a combination comprising at least one of the foregoing. In cases where the thermoplastic composition is to be coextruded the composition can have an elongation to break of 20 to 120%, a flexural modulus of 800 to 4000 MPa, and a notched Izod of 200 to 1800 J/m.

The thermoplastic composition can be injection molded and/or thermoformed to form an article as well. Advantageously, our composition now provides a previously unmet need for a composition that has a ductility that is better than aromatic polyketones such as polyaryletherketone resins and that still retains the advantageous processing features found in aromatic polyketone resins. Users can now make a variety of articles that exhibit performance properties that are valued by their respective customers.

Further information is provided by the following non-limiting examples

EXAMPLES

The examples use the materials shown in Table 1.

Examples 1-10 and Comparative Examples 1-5 were prepared by melt mixing using a two lobe 24 millimeter (mm) co-rotating intermeshing twin-screw extruder. Unless otherwise specified, the components were added at the feed throat of the extruder. The extruder was set with barrel temperatures of 300° C. to 360° C. The material was run at 10-12 kilograms per hour (kg/hr) with the screw rotating at 300 rotations per minute (rpm). The torque was maintained typically in the 50-70% range.

The examples were tested for glass transition temperature (Tg) by differential scanning calorimetry (DSC) in a nitrogen atmosphere; results are in ° C. Notched Izod was determined according to ASTM D 256 at 23° C. on 3.2 millimeter thick bars; results are reported in Joules per meter (J/m). Tensile modulus, tensile strength, and elongation to break were determined according to ASTM D 638 on 3.2 millimeter thick type I bars. Tensile strength is reported at yield. Flexural modulus and flexural strength were determined according to ASTM method D790 and results are reported in MPa. Delamination was evaluated by visual inspection as described above. Compositions and data are shown in Tables 2-4. Amounts are given in weight percent based on the total weight of the composition. Test parts were injection molded at 340 to 370° C. using a 30 second cycle time from resin dried for at least 4 hours at 150 to 170° C. All molded samples were conditioned for at least 48 hours at 23° C. and 50% relative humidity prior to testing.

The expected Notched Izod value for a blend was calculated using the formula:

$$[A1/(A1+A2) \times \text{Notched Izod of PEEK}] + [A2/(A1+A2) \times \text{Notched Izod of polysiloxane/polyimide block copolymer}]$$

where A1 is the amount of PEEK in the composition and A2 is the amount of the polysiloxane/polyimide block copolymer.

Examples 1-10 and Comparative Examples 1-5

Examples 1-10 were made, molded and tested as described above. Comparative Examples 1-5 (CE 1-5) were molded and tested as described above. Compositions and results are shown in Table 2.

| Material | Description and Supplier |
|---|---|
| PEEK ™ resin 1 | A polyetheretherketone commercially available from VICTREX under the tradename PEEK 450 G. |
| PEEK ™ resin 2 | A polyetheretherketone commercially available from VICTREX under the tradename PEEK 150 G. |
| SILTEM ™ STM 1700 resin | A polysiloxane/polyetherimide extended block copolymer having a siloxane content of 20 weight percent, based on the total weight of the block copolymer. The material is commercially available from SABIC Innovative Plastics US LLC. |
| SILTEM ™ STM 1600 resin | A polysiloxane/polyetherimide extended block copolymer blend having a siloxane content of 30 weight percent, based on the total weight of the block copolymer. The material is commercially available from SABIC Innovative Plastics US LLC. |
| SILTEM ™ STM 1500 resin | A polysiloxane/polyetherimide extended block copolymer having a siloxane content of 40 weight percent, based on the total weight of the block copolymer. The material is commercially available from SABIC Innovative Plastics US LLC. |

TABLE 2

|  | 1 | 3 | 6 | 8 | CE-4 | CE-5 |
|---|---|---|---|---|---|---|
| PEEK ™ resin 1 | 90 | 75 | 90 | 75 | 90 | 75 |
| SILTEM ™ STM 1700 resin | 10 | 25 |  |  |  |  |
| SILTEM ™ STM 1600 blend |  |  | 10 | 25 |  |  |
| SILTEM ™ STM 1500 resin |  |  |  |  | 10 | 25 |
| Delamination on Extrusion | No | No | No | No | Yes | Yes |
| Delamination on Molding | No | No | No | No | Yes | Yes |
| Siloxane Content in Polysiloxane/Polyimide Block Copolymer | 20 | 20 | 30 | 30 | 40 | 40 |

TABLE 3

|  | CE 1 | 1 | 2 | 3 | 4 | 5 | CE 2 |
|---|---|---|---|---|---|---|---|
| PEEK ™ resin 1 | 100 | 90 | 85 | 75 | 50 | 25 | — |
| SILTEM ™ STM 1700 resin | — | 10 | 15 | 25 | 50 | 75 | 100 |
| Siloxane in overall blend composition | 0 | 1 | 3 | 5 | 10 | 15 | 20 |
| Tensile modulus (MPa) | 3795 | 3588 | 3276 | 2915 | 2492 | 2185 | 2021 |
| Tensile strength (MPa) | 96 | 91 | 86 | 77 | 73 | 68 | 60 |
| Elongation to break (%) | 21 | 23 | 30 | 79 | 92 | 49 | 19 |
| Flexural modulus (MPa) | 4100 | 3795 | 3422 | 2845 | 2523 | 2078 | 1718 |
| Flexural strength (MPa) | 156 | 145 | 131 | 113 | 101 | 91 | 89 |
| Notched Izod (J/m) | 71 | 72 | 80 | 127 | 1665 | 577 | 406 |
| Expected Notched Izod (J/m) | — | 104 | 121 | 154 | 238 | 322 | — |

TABLE 4

|  | CE 1 | 6 | 7 | 8 | 9 | 10 | CE 3 |
|---|---|---|---|---|---|---|---|
| PEEK ™ resin 1 | 100 | 90 | 85 | 75 | 50 | 25 | — |
| SILTEM ™ STM 1600 grade | 0 | 10 | 15 | 25 | 50 | 75 | 100 |
| Siloxane in overall blend composition | 0 | 1.5 | 4.5 | 7.5 | 15 | 22.5 | 30 |
| Tensile modulus (MPa) | 3795 | 3544 | 3099 | 2649 | 1984 | 1314 | 1159 |
| Tensile strength (MPa) | 96 | 90 | 81 | 72 | 57 | 39 | 33 |
| Elongation to break (%) | 21 | 20 | 19 | 6 | 9 | 11 | 14 |
| Flexural modulus (MPa) | 4100 | 3699 | 3105 | 2390 | 1770 | 1148 | 1101 |
| Flexural strength (MPa) | 156 | 140 | 116 | 89 | 64 | 41 | 40 |
| Notched Izod (J/m) | 71 | 82 | 90 | 488 | 486 | 402 | 297 |
| Expected Notched Izod (J/m) | — | 94 | 105 | 128 | 184 | 240 | — |

EP323142B1 teaches, in part, that although it would be expected that a blend of PEEK and silicone-polyimide would improve over PEEK alone, "this is not so." EP 323142B1 teaches that "it would seem that the two materials are insufficiently mutually compatible so that two phases remain after thorough blending resulting in separation and inhomogeneity upon extrusion and fibrillation and poor flexibility of the extruded product." Comparative examples 1 and 2 in Table 2 confirm this finding for blends of PEEK with SILTEM™ STM 1500 resin (polysiloxane/polyetherimide extended block copolymer having a siloxane content of 40 weight percent). It is surprisingly found that when SILTEM™ STM 1500 resin in the same compositions is replaced with SILTEM™ STM 1600 or SILTEM™ STM 1700, the compositions show desirable impact properties and demonstrate no delamination during extrusion or in molded parts.

The blended resins in Tables 3 and 4 showed excellent compatibility with no delamination visible to the naked eye. All of the blends showed Notched Izod values better than the PEEK resin alone. Additionally, some blends (see examples 4, 5, and 8-10) showed an unexpected increase in Notched Izod strength. The Notched Izod value was greater than either of the individual resins. Similarly, elongation to break values for blends comprising a polysiloxane/polyimide block copolymer having a siloxane content of 20 weight percent are higher than the individual resins.

Some of the examples and comparative examples were further tested for glass transition temperature (Tg) and melting temperature (Tm) using differential scanning calorimetry (DSC). Results for Tg and Tm are in ° C. The crystallinity of the samples was calculated using a value of 130 Joules per gram for 100% crystalline polyetheretherketone. The cooling rate was 90° C. per minute. The examples were tested using a pellet or molded part as indicated in Table 5.

TABLE 5

| | Tg (° C.) | Enthalpy of Melting-heating Cycle (J/g) | % Crytallinity in blend (heating) | Tm (° C.) | Melt Crystallization temperature (cooling) Tc (° C.) | Enthalpy of Melting-(Cooling) Cycle (J/g) | % Crytallinity in blend (cooling) |
|---|---|---|---|---|---|---|---|
| CE 1 | 145 | 47.0 | 36% | 341 | 279 | 38 | 29% |
| 3 (pellet) | 150 | 36.2 | 28% | 342 | 258 | 31 | 24% |
| 4 (pellet) | 157 | 24.9 | 19% | 341 | 255 | 20 | 16% |
| 5 (pellet) | 180 | 14.0 | 11% | 338 | 256 | 8 | 6% |
| 3 (molded) | 150 | 30.2 | 23% | 342 | 251 | 29 | 22% |
| 4 (molded) | 160 | 21.6 | 17% | 340 | 249 | 21 | 16% |
| 5 (molded) | 178 | 10.3 | 8% | 338 | 242 | 5 | 4% |
| CE 2 | 198 | — | — | — | — | — | — |

Polyaryletherketone is a crystalline material. It is known that polyaryletherketone and many amorphous polyetherimides are completely miscible and the resulting blends are amorphous as well. Without being bound by theory it is believed that due to the miscibility of the two resins the polyetherimide prevents the crystalline structure of the polyaryletherketone from forming. Surprisingly the data shown in Table 5 indicates that blends of polyaryletherketone and a polysiloxane/polyimide extended block copolymer are crystalline. The blends have a melting temperature (amorphous materials do not) and a measurable crystallinity. The crystallinity is present in both pellets and molded parts in similar amounts, indicating that the crystalline phenomenon is robust.

Examples 11-13 and Comparative Examples 2 and 6

The pellet samples of the examples were prepared by melt mixing using a two lobe 30 millimeter (mm) co-rotating intermeshing twin-screw extruder. All formulations were dry blended and tumbled prior to melt mixing. Unless otherwise specified, the components were added at the feed throat of the extruder. The extruder was set with barrel temperatures of 300° C. to 360° C. The material was run at 10-15 kilograms per hour (kg/hr) with the screw rotating at 300 rotations per minute (rpm). The torque was maintained typically in the 40-70% range. Table 6 shows the compositions that were used; amounts are in weight percent based on the total weight of the composition.

The wire coatings from the example pellets were made on a single screw extruder (length/diameter ratio of 25) using a tube die (die land length=8 millimeters (mm); draw down ratio (DDR)=3 and draw ratio balance (DRB)=1). The example pellets were dried at 105° C. for 8 hours prior to extrusion. The wire coating thickness was in the range of 0.3-0.4 mm and the coating was done on solid copper wire, which was preheated to 80° C. The wire extrusion was done at 350-370° C. melt temperature, 4.5 megPascals (Mpa) melt pressure and 20-50 meters/minute line speed.

The tensile measurements on wire samples were done using Instron 3365, which is an electro-mechanical Universal Testing Machine (UTM). Test samples of 80-100 mm in length were slit open from wire sample using a fresh razor blade. As the insulation is hard, they could not be stripped using conventional wire stripper. The end of the sample is wrapped with aluminum foil, to avoid jaw crush.

The sample was then gripped using the pneumatic grip with 30 psi pressure. The extensometer was attached to the sample, the tension in the extensometer is adjusted to ensure no slippage of the extensometer and no breakage of the sample happens during gripping and testing. Results are reported in % and are shown in Table 6.

Limiting oxygen index (LOI) measurements were done on 3.2 mm thickness Izod bars according to ISO 4589 method. The results are reported in percent oxygen required to ignite the sample. Results are shown in Table 6. Taber abrasion was measured on 4 inch dynatup disks using the CS-17 method (1 kilogram load, 1000 cycles) and results are reported in milligrams of material abraded. Results are shown in Table 6.

The fatigue resistance of stripped insulation wire was measured similar to flex test done as per IEC 227 standard. A 100 mm length stripped insulation was fixed horizontally into a flex-fatigue tester. The test is carried out at 23° C. The insulation was displaced 5 mm above and 5 mm below its mean position at 3 Hz for a million cycles and was observed visually for crazing or cracking. Results are reported in the number of cycles to failure. Results are shown in Table 6.

Conventional toxicity index (ITC) was carried out as per DIN standard, EN50305. As per the protocol, test was carried out to measure concentration of gases evolved when 1 gram of sample is burned in a volume of 1 cubic meter ($m^3$). The concentrations of evolved gases ($CO$, $CO_2$, $SO_2$, $HCN$ and $NO_x$) were measured. The toxicity index is measured by the formula given below, wherein $t_i$ are measured concentrations and $C_{ci}$, are critical concentrations as mentioned by the standards. The ITC as such is unit less, but is a % of ratio of concentrations. I.T.C.=$100 \times \Sigma(ti/Cci)$. Compositions and data are shown in Table 6.

TABLE 6

| | CE 2 | 11 | 12 | 13 | CE 6 |
|---|---|---|---|---|---|
| PEEK resin 2 | 0 | 25 | 50 | 75 | 100 |
| SILTEM STM 1700 | 100 | 75 | 50 | 25 | 0 |
| Siloxane in overall blend | 20 | 15 | 10 | 5 | 0 |

TABLE 6-continued

| composition (wt %) | CE 2 | 11 | 12 | 13 | CE 6 |
|---|---|---|---|---|---|
| % Tensile Elongation, Break | 80 | 190 | NA | 200 | 15 |
| Flex-Fatigue (number of cycles to failure | >1 million | >1 million | NA | >1 million | >1 million |
| Limiting Oxygen Index | 48 | 50 | 52 | 50 | 35 |
| Taber abrasion | 49 | 48 | 36 | 21 | — |
| Conventional Toxicity Index (ITC) | 19 | 12.7 | 10 | 7 | +++ |

+++ - expected value less than 7

As demonstrated in Table 6 the results show that wire coatings made from the combination of PEEK and SILTEM resin exhibited unexpectedly better results than wire coatings made from SILTEM or PEEK resin alone.

The blended resins in Table 6 showed excellent compatibility with no delamination (i.e. imhomogeneity) visible to the naked eye. The blends showed excellent tensile elongation to break values much better than the individual resins. The blends also have very high limiting oxygen index values compared to the PEEK resin alone, thus exhibiting improved flame resistance of the blends. Additionally, the blends showed a dramatic improvement in the abrasion resistance and toxicity index compared to STM1700 resin alone and a similar flex-fatigue performance to the individual resins.

Examples 11, 13 and Comparative Example 6 were tested for storage modulus as a function of temperature. Dynamic Mechanical Analysis [DMA] for storage modulus was carried out on a Rheometric Scientific RSA III instrument under tensile mode on wire insulation samples of approximate 0.3-0.4 mm thick and 20 mm in length sample. These samples were cut out from wire-coated samples. The samples were strained at a frequency of 10 rads/sec while the temperature was increased from 30° C. to 350° C. at a rate of 4° C./min. Measurements were made at 30 sec intervals. Data are shown in Table 7. Results are in megaPascals (Mpa).

TABLE 7

| Temp | 11 | 13 | CE 6 |
|---|---|---|---|
| 40 | 235 | 313 | 431 |
| 75 | 200 | 289 | 386 |
| 100 | 179 | 200 | 353 |
| 125 | 160 | 256 | 323 |
| 140 | 144 | 183 | 123 |
| 150 | 126 | 90 | 14 |
| 160 | 103 | 36 | 36 |
| 165 | 86 | 0.5 | 0.4 |
| 170 | 44 | 0.8 | 0.3 |
| 180 | 13 | 1.7 | 0.4 |
| 190 | 0.9 | 2.8 | 0.3 |
| 200 | 0.3 | 3 | 0.2 |

The results show that wire coatings made with the blends retained their respective storage modulus properties significantly better, as compared to PEEK alone, at higher temperatures. At 40° C., for instance, the storage modulus of the wire coatings of Examples 11 and 13 (made with 75/25 and 25/75 SILTEM/PEEK blends) was 235 MPa and 313 MPa, respectively, while the PEEK exhibited a storage modulus of 431 MPa. When the storage modulus was measured at higher temperature, a clear trend was observed. At 150° C., for instance, the wire coatings of Examples 11 and 13 had lost 46% and 71% of their storage modulus from 40° C., while the wire coatings made from PEEK had lost 97% of their modulus. The greater retention of modulus at higher temperatures, above the glass transition temperature of PEEK (~143° C.) would enable the use of the compositions at high temperatures.

Comparative Example 2, Comparative Example 6 and Examples 11-13 were tested for viscosity. Capillary Rheometry was done on pellet samples at 360° C. and shear viscosity as a function of shear rate was measured. Viscosity values are in Pascal-seconds (Pa-s) and are shown in Table 8.

TABLE 8

| Apparent Shear Rate (1/s) | CE 2 | 11 | 12 | 13 | CE 6 |
|---|---|---|---|---|---|
| | Apparent shear viscosity (Pa-s) | | | | |
| 500 | 215 | 207 | 238 | 287 | 315 |
| 1000 | 157 | 155 | 255 | 328 | 350 |
| 5000 | 72 | 73 | 81 | 93 | 99 |

The data in Table 8 demonstrates that wire coatings made from PEEK/SILTEM blends have relatively lower melt viscosity, as compared to PEEK alone, which means that the compositions have excellent processability, particularly for extrusion processes.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety as though set forth in full.

The invention claimed is:

1. An electrical wire comprising a conductor and a covering disposed over the conductor wherein the covering comprises a thermoplastic composition and the thermoplastic composition comprises a polymer component, wherein the polymer component consists or a non-delaminated blend of
an aromatic polyketone and
a polysiloxane/polyimide block copolymer,
wherein the polysiloxane/polyimide block copolymer has a siloxane content that is more than 0 and less than 40 weight percent, based on the total weight of the block copolymer, and the siloxane block comprises a unit of Formula (I)

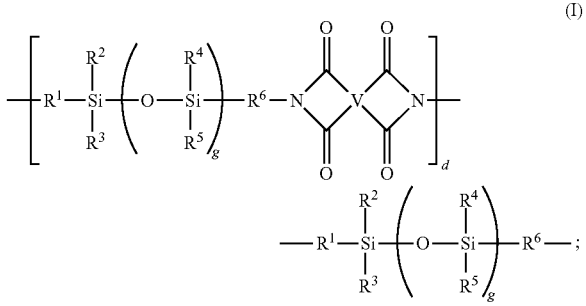

wherein

R¹⁻⁶ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20.

2. The electrical wire of claim 1, wherein the thermoplastic composition has a glass transition temperature of 100° C. to 300° C.

3. The electrical wire of claim 1, wherein the thermoplastic composition has a limiting oxygen index of 30 to 60 as determined on 3.2 mm thick Izod bars according to ISO 4589.

4. The electrical wire of claim 1, wherein the covering has a tensile elongation at break of 10 to 300%.

5. The electrical wire of claim 1, wherein the polyketone is a polyaryletherketone.

6. The electrical wire of claim 5, wherein the polyaryletherketone is a polyetheretherketone.

7. The electrical wire of claim 1, wherein the aromatic polyketone is present in an amount of 1 to 95 weight percent and the polysiloxane/polyimide block copolymer is present in an amount of 5 to 99 weight percent and weight percents are based on the combined weight of the aromatic polyketone and polysiloxane/polyimide block copolymer.

8. The electrical wire of claim 1, wherein the blend has a siloxane content, based on the combined weight of the polysiloxane/polyimide block copolymer and the aromatic polyketone, of 1 to 25 weight percent.

9. The electrical wire of claim 1, wherein the covering has a thickness of 0.5 to 500 mils.

10. The electrical wire of claim 1, wherein the polysiloxane/polyimide block copolymer has a siloxane content greater than or equal to 20 weight percent.

11. An electrical wire comprising a conductor and a covering disposed over the conductor wherein the covering comprises a thermoplastic composition and the thermoplastic composition comprises a polymer component, wherein the polymer component consists of a non-delaminated blend of an aromatic polyketone and a polysiloxane/polyimide block copolymer, wherein the polysiloxane/polyimide block copolymer has a siloxane content greater than or equal to 20 weight percent and less than 40 weight percent, based on the total weight of the block copolymer and the siloxane block comprises a unit of Formula (I)

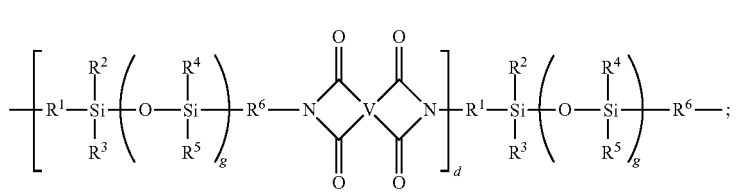

wherein the thermoplastic composition has a limiting oxygen index of 30 to 60 as determined on 3.2 mm thick Izod bars according to ISO 4589.

wherein

R¹⁻⁶ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20 and

* * * * *